(12) United States Patent
Margiott et al.

(10) Patent No.: US 6,828,048 B2
(45) Date of Patent: Dec. 7, 2004

(54) SHUT-DOWN PROCEDURE FOR FUEL CELL FUEL PROCESSING SYSTEM

(75) Inventors: Paul R. Margiott, South Windsor, CT (US); Christopher W. Callahan, Windsor Locks, CT (US); Michael L. Perry, South Glastonbury, CT (US); Glenn W. Scheffler, Tolland, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 367 days.

(21) Appl. No.: 09/992,591

(22) Filed: Nov. 6, 2001

(65) Prior Publication Data

US 2003/0087138 A1 May 8, 2003

(51) Int. Cl.[7] .......................... H01M 8/04; H01M 8/18; B01J 8/02
(52) U.S. Cl. ............................. 429/17; 429/13; 429/19; 422/187; 422/212
(58) Field of Search ............................. 429/17, 22, 13, 429/19, 12; 422/187, 189, 190, 212; 502/38, 20

(56) References Cited

U.S. PATENT DOCUMENTS

| | | | |
|---|---|---|---|
| 4,115,627 A | 9/1978 | Christner et al. | 429/44 |
| 4,537,839 A | 8/1985 | Cameron | 429/20 |
| 5,045,414 A | 9/1991 | Bushnell et al. | 429/17 |
| 5,154,986 A | * 10/1992 | Takechi et al. | 429/23 |
| 5,248,567 A | 9/1993 | Amemiya et al. | 429/20 |
| 5,503,944 A | 4/1996 | Meyer et al. | 429/13 |
| 6,024,848 A | 2/2000 | Dufner et al. | 204/252 |
| 6,033,634 A | 3/2000 | Konga | 422/198 |
| 6,159,626 A | 12/2000 | Keskula et al. | 429/22 |
| 6,280,864 B1 | 8/2001 | Towler et al. | 429/17 |

* cited by examiner

Primary Examiner—Raymond Alejandro

(57) ABSTRACT

A fuel cell system that includes fuel processing components, such as a reformer and shift converter, for converting an organic fuel to hydrogen, is shut-down by disconnecting the fuel cell from its load and purging the fuel processing components of residual hydrogen with a flow of air. The purge air may be forced through the components in series or in parallel, using a blower; or, the purge air may be allowed to enter the components through a low inlet, whereupon the air rises through the components by natural circulation and exits through a high outlet, along with the residual hydrogen.

17 Claims, 2 Drawing Sheets

SHUT-DOWN PROCEDURE FOR FUEL CELL FUEL PROCESSING SYSTEM

BACKGROUND OF THE INVENTION

1. Technical Field

This invention relates to fuel processing systems, and more particularly fuel processing systems used to generate hydrogen from organic fuels for fuel cell use.

2. Background Information

Fuel cell systems, including the catalytic components of a fuel processing system for converting organic fuel to hydrogen, and especially the anode side of the fuel cell itself, generally require purging upon shut-down and/or start-up to remove residual hydrogen (upon shut-down) and to remove air upon start-up. This is necessitated for several reasons, including the elimination of the potential for flammable mixtures of hydrogen and oxygen; minimizing performance degradation of fuel processing system catalysts and electrode catalysts; and prevention of hazardous material formation during the start-up and shut-down process. The latter may occur, for example, in reformers containing nickel as catalyst. Nickel reacts with carbon monoxide forming a toxic nickel carbonyl. Common practice is to purge components with inert gas such as nitrogen or nitrogen mixed with other gases harmless to the component being purged. For example, U.S. Pat. No. 4,537,839 describes using inert gases (defined therein as gases "substantially free of hydrogen"), such as product gases from a catalytic combustor, to purge a fuel cell. U.S. Pat. No. 5,248,567 also describes the use of a fuel cell purge gas from which the combustion elements (mainly oxygen and reactive carbon) have been removed.

In fuel cell power plants, it is also known to use inert gas, such as nitrogen, to purge (upon shut-down) components of fuel processing systems that convert organic fuels, such as gasoline or natural gas, to hydrogen. It is desirable to avoid the cost and complexity of providing an inert purge gas for either the fuel cells or the fuel processing system.

BRIEF SUMMARY OF THE INVENTION

In accordance with the present invention, a fuel cell system that includes a fuel reformer for converting an organic fuel to hydrogen is shut-down by disconnecting the fuel cell from its load, halting the flow of organic fuel to the reformer, and purging the reformer of residual hydrogen by flowing air through the reformer.

If the reformer is a steam reformer or autothermal reformer, it may be purged simultaneously with steam and air; however, it is preferred to purge first with steam and then with air. There will be residual raw fuel upstream of the reformer immediately upon shut-down. As the purge occurs, the fuel will enter the still hot reformer and react. An initial steam purge is desirable because it helps to maintain the correct reactant ratios during the purge process and insures that no undesirable reactions, such as carbon formation, occur during this period. Steam also provides a buffer between a fuel rich environment and an air environment mitigating safety concerns.

If, as is often the case, the fuel processing system includes one or more other components, such as a shift converter, selective oxidizer, and/or desulfurizer, those components may also be purged of residual hydrogen using air, and preferably by passing air in series through the components, with the purge gas output of one component passing into and through the next component. If a component uses a catalyst that is not tolerant of oxygen, that component may be bypassed and purged by conventional means, such as with inert gas.

After passing through the reformer and/or other fuel processing components, the purge gases may be directed through the anode flow field of the fuel cell to purge residual hydrogen from the anode side of the cell. Alternatively, the purge gases may be vented from the fuel cell system, such as to atmosphere, without passing them through the fuel cell.

Rather than passing the purge air through the fuel processing components in series, components may be purged in parallel, each with its own individual flow of purge air that is vented to atmosphere.

In accordance with the present invention it is preferred to purge the fuel processing components with a volume of air at least three times the volume of the largest component being purged to assure sufficiently complete removal of the hydrogen, which would be to less than 4% by volume (the flammability limit of hydrogen in air) and preferably to less than 1%. In any event, the purge gas moves through the reactors more or less as a front. Reaction on the various catalyst beds reduces the hydrogen content at the leading edge of the front to essentially zero.

Although a blower may be used to push the purge air and other gases through the fuel processing components and associated plumbing, in one embodiment of the present invention a passive purge is contemplated. In that embodiment, the fuel processing components to be purged may be arranged in a vertical stack. One or more valved purge air inlets are located at low points of the fuel processing stack and one or more valved purge gas outlet are located at high points in the stack. During fuel cell operation both the purge air inlets and outlets are closed. Upon shut-down of the fuel cell, after turning off the flow of fresh fuel the purge air valves are opened. Air enters the inlet(s) and, by natural circulation, rises through the fuel processing stack, along with the residual hydrogen and any other gases. The gases leave the fuel processing stack through the outlet(s). Eventually only air remains within the components. If a vertical fuel processing stack is not desired or practical for an installation, the components may be individually and separately passively purged.

Although a fast air purge, using a blower or the like, is preferred, the passive air purge has the advantage of requiring little or no power. For, example, the purge air valves may be designed to open when de-energized. In that case, the purging is accomplished with no external power source.

If the fuel cell anode flow field is also to be purged with air (instead of an inert gas), speed is more critical, and the air front should move through the anode flow field in no more than about 1.0 seconds, and preferably less than 0.2 seconds. This would require a blower or the like.

The direction of the air purge through a component is not critical. In other words, the purge air may be directed through the components in either the same or the opposite direction from the flow of fuel during fuel processing. However, to maximize the speed of natural circulation in a vertical fuel processing stack (by taking advantage of gas density differences due to temperature and gas composition), it is preferred to stack the fuel processing components so as to enable purging in a direction opposite to the fuel processing flow direction.

The foregoing features and advantages of the present invention will become more apparent in light of the following detailed description of exemplary embodiments thereof as illustrated in the accompanying drawings.

DETAILED DESCRIPTION OF THE INVENTION

Figure 1:
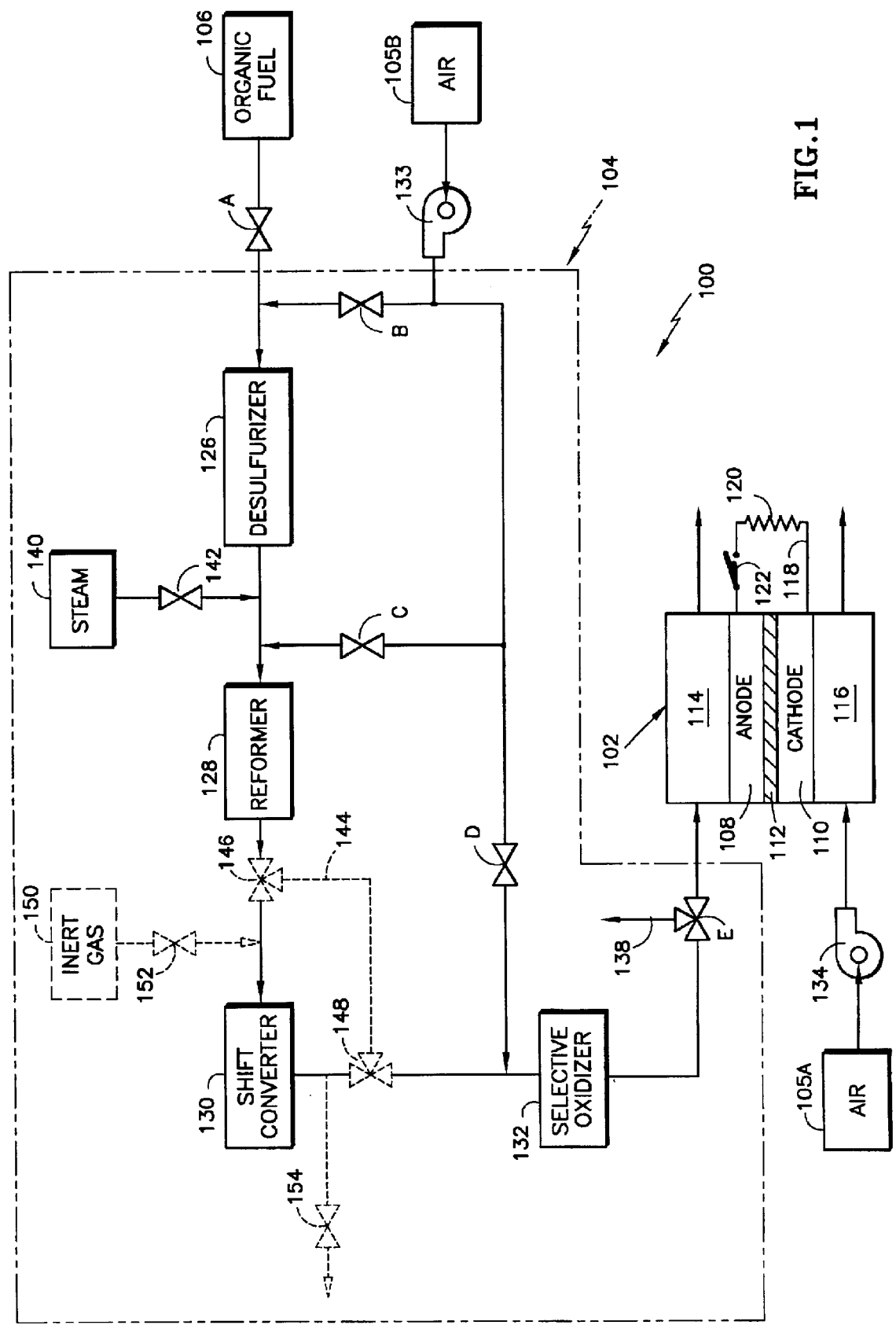
FIG. 1 is a block diagram of an example of a fuel cell system that may be shut-down in accordance with the procedures of one embodiment of the present invention.

Referring to FIG. 1, a fuel cell system, generally represented by the numeral 100, is shown comprising a fuel cell 102 and a fuel processing system 104, sources of oxidant (which are here designated by the boxes 105A and 105B, both of which are simply uncontained atmospheric air), and a source of organic fuel 106, such as natural gas, gasoline, or methanol. The fuel cell 102 comprises an anode electrode 108, a cathode electrode 110, and an electrolyte 112 disposed between the electrodes. The electrolyte may be in the form of a proton exchange membrane (PEM) of the type described in U.S. Pat. No. 6,024,848, or the electrolyte may be held within a ceramic matrix, such as is typically found in acid electrolyte fuel cells, such as phosphoric acid electrolyte fuel cells. The cell also includes an anode flow field plate 114 adjacent the anode electrode and a cathode flow field plate 116 adjacent the cathode electrode. The cathode flow field plate has a plurality of channels (not shown) extending thereacross adjacent the cathode electrode forming a cathode flow field for carrying air from the source 105 across the cathode electrode. The anode flow field plate has a plurality of channels (not shown) extending thereacross adjacent the anode electrode forming an anode flow field for carrying a hydrogen containing fuel from the fuel processing system 104 across the anode electrode. An external circuit 118, including a primary load 120, is connected across the anode and cathode electrodes. A switch 122 in the circuit allows the fuel cell to be either connected or disconnected from the load.

Although only a single cell is shown, in actuality a fuel cell system 100 would include a plurality of adjacent cells connected electrically in series. For more detailed information regarding fuel cells like the one represented in FIG. 1, the reader is directed to commonly owned U.S. Pat. No. 5,503,944 (PEM cells) and U.S. Pat. No. 4,115,627 (phosphoric acid electrolyte cells), both of which are incorporated herein by reference.

The components of the fuel processing system of this embodiment each involve catalytic reactions, and include a desulfurizer 126, an autothermal reformer 128, a shift converter 130, and a selective oxidizer, 132. These components are arranged in series flow relationship. A steam source 140 provides steam for the reformer via a flow control valve 142.

As is well known in the fuel cell art, sulfur and carbon monoxide are detrimental to fuel cells and fuel processing system components and need to be eliminated or at least reduced to very small concentration levels deemed acceptable for the particular installation. In one type of desulfurizer, known as a hydrodesulfurizer, the sulfur in the fuel is reacted with hydrogen to form a hydrogen sulfide gas, which then passes through an adsorbent bed containing zinc. In the adsorbent bed the hydrogen sulfide reacts with the zinc forming a zinc sulfide and essentially removing all of the sulfur from the fuel stream. The reformer converts hydrocarbons to a hydrogen rich stream that includes other gases, such as carbon monoxide and carbon dioxide. The shift converter reduces the carbon monoxide concentration by reacting carbon monoxide with water to produce carbon dioxide (which is harmless to the fuel cell) and hydrogen. The selective oxidizer further reduces the carbon monoxide concentration by reacting carbon monoxide with oxygen to produce carbon dioxide.

Although, in FIG. 1, the fuel processing system includes both a desulfurizer and a selective oxidizer, the shut-down procedure of the present invention may be used in fuel cell systems that do not include such components. The nature of the organic fuel from the source 106 (whether that fuel contains any or unacceptable levels of sulfur, for example) and the tolerance of the fuel cell to carbon monoxide will determine the need for a desulfurizer and selective oxidizer.

During normal fuel cell operation, shut-off valves A, C and D are open; shut-off valve B is closed; diverter valve E is set to direct all fuel processing system output into the anode flow field 114; the switch 122 in the external circuit 118 is closed; and the air blowers 133, 134 are on. The steam flow valve 142 is also open. In that mode, organic fuel from the source 106 flows into and through the desulfurizer wherein sulfur is removed. The output from the desulfurizer and air (either ambient or humidified) from the source 105B and steam from the source 140 enters the autothermal reformer 128. The autothermal reformer uses a noble metal catalyst, such as platinum or a platinum alloy. The air reacts with the desulfurized fuel in the reformer and the reformer output is directed into the shift converter where, in the presence of a noble metal catalyst, such as platinum or platinum alloy, converts most of the carbon monoxide to carbon dioxide and hydrogen. The shift converter output, along with additional air from the source 105B, enters the selective oxidizer, where carbon dioxide concentration is further reduced in the presence of a noble metal catalyst, such as platinum.

The output from the selective oxidizer, which is essentially hydrogen, carbon dioxide, nitrogen, and water, passes through the anode flow field and exits the cell. On the other side of the cell, the blower 134 pumps air from the source 105A through the cathode flow field.

In accordance with one embodiment of the present invention, the fuel cell system 100 is shut-down as follows: The switch 122 is opened, disconnecting the fuel cell from the load 120. The valve A is closed to halt the flow of organic fuel into the fuel processing system. To minimize mixing and to halt the direct flow of air into the reformer and into the selective oxidizer, the valves C and D are preferably closed, but they may remain open, if desired. The diverter valve E is set to vent the selective oxidizer output gases to atmosphere through the conduit 138, rather than through the fuel cell. Immediately after disconnecting the fuel cell from its load, the steam purge valve 142 is opened to purge the autothermal reformer with steam for a brief period of time. Preferably, the steam purge time is sufficient to pass a volume of steam through the reformer equivalent to at least three times the volume of the reformer. The valve 142 is then closed.

With the air blower 105B remaining on, the valve B is then opened to direct a flow of air from the source 105B in series through the desulfurizer, reformer, shift converter, and selective oxidizer, to purge those components of residual hydrogen, which is vented through the conduit 138. (Optionally, the valve E may be set to direct the selective oxidizer output gases through the anode flow field 114 to purge the fuel cell itself of residual hydrogen.) Although not preferred, the reformer may be purged simultaneously with steam and air.

If the reformer 128 were a steam reformer rather than an autothermal reformer, the foregoing purge procedure would be the same. If the reformer were a partial oxidation reformer, steam is not used during reforming and may not be available for purging. In that case, only an air purge would be used.

The required purge flow volume is a function of component design. It is preferred that a volume of air at least three times the volume of the largest component being purged be passed through the fuel processing system during the purge to assure complete removal of the residual hydrogen.

As mentioned above, the primary purpose of the purge is to rid the system of residual hydrogen, for safety. Once the hydrogen concentration is reduced to an acceptable level, the blower 133 may be turned off. It is not critical, however, to close the valves B and E at that time, as long as they are appropriately reset when it is time to start-up of the fuel cell system. During the shut-down mode, even after the blower 133 is turned off, the fuel processing system components will continue to slowly cool down. As the air within the system cools to ambient, a sub-ambient pressure (i.e. a vacuum) is created which will pull additional ambient air into the system. A valve, such as diverter valve E, may be left open during cool down to minimize the vacuum to prevent mechanical damage to components.

In the foregoing embodiment, the purge air is introduced into the fuel processing system such that it flows through the fuel processing system components in the same direction and order as when hydrogen is being produced for consumption in the fuel cell. This is preferred, since the reformer is the hottest component at the time of initiating shut-down; and, for improved safety, the hottest component is best purged most quickly, and by purge air that is cooler. The present invention contemplates, however, that the fuel processing components may be purged in reverse order.

In the foregoing embodiment, the air purge is accomplished by a single flow of air passing in series through the components. It is also possible to purge the components individually, in parallel. Fresh purge air from the source 105B could be separately introduced into the upstream end of each component, passed through, and vented from the component using appropriate plumbing and valving. As one example, the purge gas outputs from each individually purged component could be directed into a common purge gas output manifold (not shown) that is vented to atmosphere.

If the shift converter happens to use a catalyst that cannot tolerate exposure to oxygen (i.e., air), such as a copper/zinc catalyst, air should not be used to purge that component. This may be accommodated by directing the air purge output from the reformer around the shift converter using a bypass conduit 144 (shown in phantom in FIG. 1). During the production of hydrogen while the fuel cell is providing current to the load, diverter valves 146, 148 (also shown in phantom) at each end of the bypass conduit 144 would be set to direct the reformer output through the shift converter and, from there, into the selective oxidizer. During the air purge, the valves 146, 148 are set to prevent flow into the shift converter and to direct the reformer output through the bypass conduit 144 and into the selective oxidizer. Inert gas (such as nitrogen) from a source 150 (shown in phantom) could be used to separately purge the shift converter while air is being used to purge the other components. In that case, the shut-off valve 152 and vent valve 154 (both shown in phantom) would be closed during normal fuel cell operation and open during purging. After an inert gas volume of at least about 3 times the volume of the shift converter has passed through the shift converter, the valve 152 would be closed. The vent valve 154 would remain open until the shift converter has cooled to approximately ambient temperature. Although the preferred shut-down procedure is to avoid the need for a supply of inert gas, the foregoing embodiment shows one method for handling components within the fuel processing system that use catalysts that are damaged by exposure to oxygen.

Figure 2:
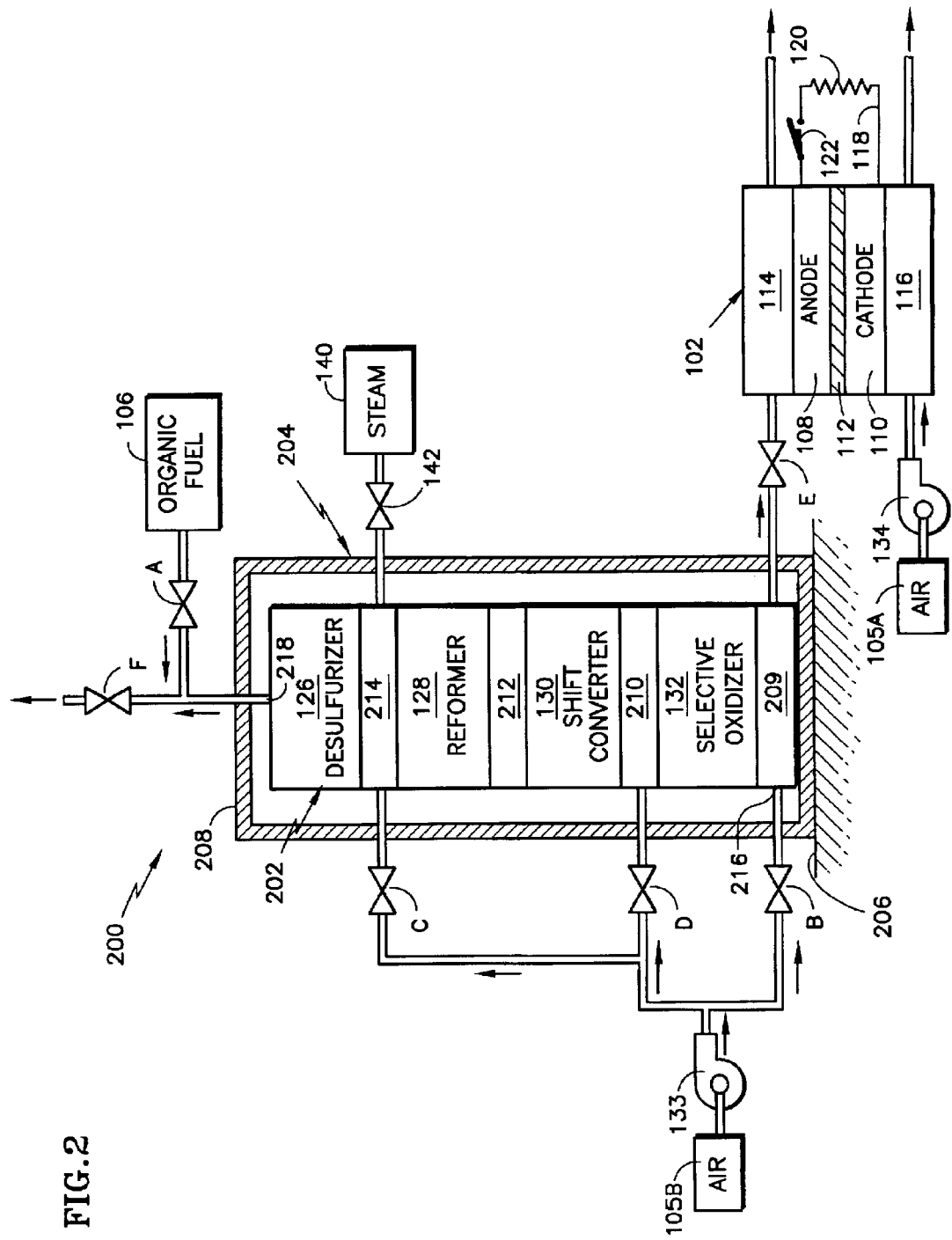
FIG. 2 is a schematic block diagram of a fuel cell system incorporating a vertical stack of fuel processing components that may be shut-down in accordance with the procedures of another embodiment of the present invention.

Another embodiment of the present invention will now be described with reference to FIG. 2. In FIG. 2, elements designated by the same reference numerals as those used in FIG. 1 represent the same elements. The overall fuel cell system of FIG. 2 is designated by the numeral 200, and the fuel processing system is generally designated by the reference numeral 204. The basic physical difference between the system 100 of FIG. 1 and the system 200 of FIG. 2 is that the fuel processing system components, desulfurizer 126, reformer 128, shift converter 130, and selective oxidizer 132 are arranged vertically, one above the other, in a fuel processing stack 202. The drawing, in schematic fashion, shows the fuel processing stack 202 resting on a base 206 and enclosed within a container 208, which may be insulated. The container 208 is optional and not required for practicing the present invention. Although not required as part of the shut-down procedure, in this embodiment, adjacent components are separated by and interconnected by plenums or manifolds designated by the numerals 209, 210, 212, and 214.

As in the first embodiment described with respect to FIG. 1, during normal fuel cell operation the switch 122 is closed; the valves A, C, D and 142 are open; valve B is closed; and the air blowers 133 and 134 are on. The valve E is open to allow the hydrogen and other gas products from the fuel processing system to enter the anode flow field 114. A purge vent valve F, the purpose of which is hereinafter explained, is closed. The organic fuel is processed as it passes in series through the desulfurizer, reformer, shift converter, and selective oxidizer, traveling from one to the other through the respective manifolds 214, 212, and 210 that interconnect them. The valves B and F may be held closed during normal fuel cell operation by a solenoid, or the like, energized by electricity produced by the fuel cell.

To shut-down the fuel cell system, the switch 122 is opened, and the valves A, C, D, E and 142 are closed. The valve B and purge vent valve F are opened. If held closed by solenoids, they could be designed to open automatically by having the solenoids become deenergized when the load is disconnected from the fuel cell. The opening of the valves B and F allows air, such as ambient air, to flow into a purge air inlet 216 located at a low point of the fuel processing stack 202 in the manifold 209 below the selective oxidizer. Due to the temperatures within the fuel processing stack and the low density of hydrogen as compared to air, the air, at least initially, is pulled into the low end of the fuel processing stack. As the air rises, its temperature increases and its density decreases. Thus the air rises, by natural circulation, through each of the components and manifolds, in series, in a direction opposite to the direction of flow during the hydrogen production within the fuel processing stack. The purge air, along with the residual hydrogen within the fuel processing stack, exits through an outlet 218 located at a high point in the fuel processing stack that, in this embodiment, is at the top of the desulfurizer 126. The purge gases are vented to atmosphere through the valve F. The purge air flow is preferably stopped when the hydrogen is gone and the temperatures within the stack return to ambient; however, those valves may remain open until the fuel cell is restarted, if desired. In one embodiment of the present invention, a hydrogen sensor (not shown) is placed at the outlet 218 or between the outlet 218 and the valve F, and is used to automatically close the valves B and F when the hydrogen concentration is below a predetermined safe level, which is 4% or less, by volume, and preferably 1% or less.

Although purging by natural circulation has been described in connection with a fuel processing system that includes a desulfurizer, reformer, shift converter, and selective oxidizer, in some fuel cell systems the fuel processing stack 202 might not include a desulfurizer or a selective oxidizer. For example, if the fuel processing stack 202 had only a shift converter and reformer, the purge air would be directed initially into an inlet near the bottom of the shift converter.

If the fuel processing components are arranged horizontally rather than vertically, the components could be purged separately and in parallel using natural circulation. Additionally, it may not be desirable to purge all the components with air. For example, in one embodiment of the present invention only the reformer is purged. The air is allowed into the reformer through an inlet at a low point of the reformer volume and rises, by natural circulation, through the reformer, exiting via an outlet at a high point of the reformer volume. The air thereby purges the reformer of residual hydrogen as it moves therethrough.

Although the invention has been described and illustrated with respect to the exemplary embodiments thereof, it should be understood by those skilled in the art that the foregoing and various other changes, omissions and additions may be made without departing from the spirit and scope of the invention.

What is claimed is:

1. In the operation of a fuel cell system comprising (A) a fuel cell and (B) a source of organic fuel, (C) a source of air, and (D) a fuel processing system for converting an organic fuel into hydrogen, the fuel processing system comprising multiple catalytic fuel processing components, including a fuel reformer in series flow relationship with a catalytic shift converter, wherein, during fuel cell operation, a load is connected across the cell and organic fuel from the source is directed, in series, through the catalyst bed of the fuel reformer, the catalyst bed of the shift converter, and fuel cell anode flow field, a procedure for shutting down the fuel cell and fuel processing system comprising the steps of:
   a. disconnecting the load from the cell and halting the flow of organic fuel from the source to the fuel processing system; and, then
   b. purging the reformer of residual hydrogen by flowing air through the reformer catalyst bed.

2. The shut-down procedure according to claim 1, wherein, after step (a), the additional step (c) of purging the shift converter of residual hydrogen by flowing air through the shift converter catalyst bed.

3. The shut-down procedure according to claim 1, wherein the reformer and fuel cell are purged of residual hydrogen by passing air, in series, through the reformer catalyst bed and thereafter through the fuel cell anode flow field.

4. The shut-down procedure according to claim 1, wherein the air purge of the reformer in step (b) is continued at least until the concentration of hydrogen in the gas stream leaving the reformer catalyst bed is below 4%, by volume.

5. The shut-down procedure according to claim 1, wherein the shift converter and reformer are purged of residual hydrogen by passing air through the reformer catalyst bed and shift converter catalyst bed.

6. The shut-down procedure according to claim 5, wherein purging step (b) also includes passing a flow of steam through the reformer catalyst bed and then the shift converter catalyst bed.

7. The shut-down procedure according to claim 6, wherein in purging step (b) the steam and purge air are introduced into the reformer catalyst bed substantially simultaneously.

8. The shut-down procedure according to claim 6 wherein, in purging step (b), the steam flow through the reformer is done immediately prior to purging the reformer catalyst bed with air.

9. The shut-down procedure according to claim 1, wherein a selective oxidizer is disposed downstream of the shift converter, and step (b) also includes purging the shift converter and selective oxidizer of residual hydrogen by passing air, in series, through the catalyst beds of the reformer, shift converter, and selective oxidizer.

10. The shut-down procedure according to claim 1, wherein a desulfurizer is disposed upstream of the reformer, and step (b) also includes purging the desulfurizer of residual hydrogen by passing air, in series, through the catalyst beds of the desulfurizer, reformer, shift converter, and selective oxidizer.

11. The shut-down procedure according to claim 1, wherein the reformer and at least one other catalytic component of the fuel processing system is purged of residual hydrogen by flowing air through the reformer catalyst bed and the catalyst bed of such at least one other component, in series, wherein the volume of air used for such purging step is at least three times the volume of the largest purged component catalyst bed.

12. The shut-down procedure according to claim 1, wherein the volume of air used to purge the reformer is at least three times the volume of the reformer catalyst bed.

13. The shut-down procedure according to claim 1, wherein in step (b) of purging the reformer using air, the purge air is introduced into the reformer catalyst bed through an inlet that is located at a low point of the reformer catalyst bed volume and passes through the reformer catalyst bed by natural circulation, exiting the reformer catalyst bed through an outlet that is located at a high point of the reformer catalyst bed volume.

14. The shut-down procedure according to claim 1, wherein the fuel processing system includes a reformer and at least one other catalytic fuel processing component arranged vertically in a stack, one above the other, and in series flow relationship, wherein, in step (b), the reformer catalyst bed and the catalyst bed of such at least one other components are purged of residual hydrogen by flowing air therethrough, in series, wherein the purge air is allowed into the stack through an inlet that is located at a low point of the catalyst bed of the vertically lowest of such catalytic component to be purged with air, and such air passes in series, by natural circulation, through each catalyst bed of such fuel processing system component to be purged, exiting the catalyst bed of the highest of such catalytic components to be purged through an outlet that is located at a high point of the catalyst bed of such highest component.

15. The shut-down procedure according to claim 14, wherein the purge air flows through the stack in a direction opposite to the direction of flow that occurs during the processing of organic fuel to produce hydrogen.

16. The shut-down procedure according to claim 14, wherein the purging of the catalyst beds by natural circulation of air is allowed to continue until the hydrogen concentration in the purge gases exiting the stack of fuel processing components comprises less than 4% hydrogen.

17. The shut-down procedure according to claim 14, wherein, in step (b), the purge air for purging the catalyst beds is allowed into and out of the stack of fuel processing components through valves which are kept closed by energy produced by the fuel cell during normal fuel cell operation, and which are de-energized and automatically open when the load is disconnected from the cell stack in step (a).

* * * * *